(12) United States Patent
Pazmany et al.

(10) Patent No.: US 8,630,911 B2
(45) Date of Patent: Jan. 14, 2014

(54) SALVAGE LIQUIDATION SYSTEM AND A METHOD TO LIQUIDATE SALVAGE

(75) Inventors: Peter Pazmany, Los Altos, CA (US); Robert R. Auray, Jr., Pittsburgh, PA (US)

(73) Assignee: Genco Marketplace, Inc, Pittsburgh, PA (US)

( * ) Notice: Subject to any disclaimer, the term of this patent is extended or adjusted under 35 U.S.C. 154(b) by 884 days.

(21) Appl. No.: 12/203,118

(22) Filed: Sep. 2, 2008

(65) Prior Publication Data

US 2010/0057584 A1 Mar. 4, 2010

Related U.S. Application Data

(60) Provisional application No. 61/041,200, filed on Mar. 31, 2008.

(51) Int. Cl.
*G06Q 30/00* (2012.01)

(52) U.S. Cl.
USPC ........................................... 705/26.1

(58) Field of Classification Search
None
See application file for complete search history.

(56) References Cited

U.S. PATENT DOCUMENTS

2006/0085300 A1* 4/2006 Green ............................ 705/30
2008/0065476 A1* 3/2008 Klein et al. ..................... 705/14

OTHER PUBLICATIONS

Gov_Auction, Government Garage Sales, IBM Center for the Business of Government, 114 pages, downloaded on Sep. 3, 2010 from http://www.businessofgovernment.org/sites/default/files/GovernmentGarageSale.pdf.*
CCR, Central Contractor Registration downloaded from http://web.archive.org/web/20031118192145/www.ccr.gov on Sep. 7, 2010, 20 pages.*

* cited by examiner

*Primary Examiner* — Paul Danneman
(74) *Attorney, Agent, or Firm* — Paul D. Bangor, Jr.; Clark Hill Thorp Reed

(57) ABSTRACT

A method for effecting electronic commerce via a network whereby salvage, excess or liquidated products to be sold are identified, and prospective buyers are qualified to purchase the products in accordance with selected conditions. The product is matched with a qualified buyer in accordance with additional conditions. The goods are then shipped, invoiced automatically, and the payments are processed directly by the buyer's financial institution or payor in response to receipt; and presentation of the invoice. The method is implemented using a suitably programmed computer containing a computer readable media.

14 Claims, 10 Drawing Sheets

Facility309-Target.com | Category79-Furniture

| BL# | BL Created Date | #Pallets | Cost |
|---|---|---|---|
| TPO115683 | 08/26/07 | 1 | 699.58 |
| TPO116657 | 08/25/07 | 1 | 781.59 |
| TP116327 | 08/25/07 | 1 | 775.21 |
| TP0116277 | 08/25/07 | 1 | 672.60 |
| TP0113829 | 08/25/07 | 1 | 883.44 |
| TP0115725 | 08/25/07 | 1 | 871.45 |
| TP0115667 | 08/25/07 | 1 | 671.55 |
| TP0115826 | 08/25/07 | 1 | 623.57 |
| TP0115402 | 08/25/07 | 1 | 563.11 |
| TP0115295 | 08/25/07 | 1 | 766.58 |
| TP0115311 | 08/25/07 | 1 | 806.65 |
| TP0115352 | 08/25/07 | 1 | 410.70 |
| TP0115196 | 08/25/07 | 1 | 850.79 |
| TP0115162 | 08/25/07 | 1 | 700.08 |
| TP0115063 | 08/25/07 | 1 | 926.03 |
| TP0115105 | 08/25/07 | 1 | 812.40 |
| TP0115048 | 08/25/07 | 1 | 851.20 |
| TP0113803 | 08/25/07 | 1 | 624.94 |
| TP0114991 | 08/25/07 | 1 | 773.15 |
| TP0113795 | 08/25/07 | 1 | 451.15 |
| TP0115022 | 08/25/07 | 1 | 907.30 |
| TP0114397 | 08/24/07 | 1 | 897.75 |
| TP0114611 | 08/23/07 | 1 | 791.55 |
| TP0113944 | 08/23/07 | 1 | 607.77 |
| TP0113670 | 08/23/07 | 1 | 730.41 |
| TP0113902 | 08/23/07 | 1 | 1093.16 |
| TP0113894 | 08/23/07 | 1 | 703.15 |
| TP0072967 | 08/18/07 | 1 | 0.00 |

| Buyer ID | Name | Phone | Fax | Email | Safe Amt. | Last Act Date | Max Rec% |
|---|---|---|---|---|---|---|---|
| 12393 | DÉCOR LIQUIDATORS | 6184671100 | 6184671102 | MARK@DECORLIQUIDATORS.COM | 29,985.41 | 08/29/07 | 18.27 |
| 106 | INTERNATIONAL ENTERPRISES | 3308323821 | | matif@internationalent.com | 22,742.47 | 09/06/07 | 16.00 |
| 6288 | American Eagle Trade Group Inc. | 3056344766 | 3056358299 | kurt@eagletrade.com | 10,582.40 | 07/31/07 | 10.00 |
| 105 | R.J.'S DISCOUNT | 8005972522 | 7852676690 | ssleele@rjsks.com | 8,071.41 | 08/23/07 | 18.00 |
| 10235 | Tower Wholesale | 7165537257 | | mike@towerwholesale.net | 7,699.02 | 08/29/07 | 18.00 |

| | Facility Name | #Pallets | #Categories | Note |
|---|---|---|---|---|
| Start | Ames PA | 211 | 10 | Import |
| Start | Kmart OH | 105 | 2 | Import |
| Start | Kmart IL | 273 | 5 | Import |
| Start | Kmart NV | 173 | 4 | Import |
| Start | Kmart GA | 436 | 6 | Import |
| Start | Zellers | 158 | 3 | Import |
| Start | JC Penney's GA | 93 | 5 | Import |
| Start | J.C Penney's WI | 261 | 6 | Import |
| Start | J.C Penney's NV | 113 | 6 | Import |
| Start | Sears Orchard CA | 29 | 1 | Import |
| Start | Sears OH | 787 | 9 | Import |
| Start | Sears CA | 430 | 9 | Import |
| Start | Sears GA | 543 | 8 | Import |
| Start | Duckwal-Alco KS | 101 | 5 | Import |
| Start | HomeBase CA | 45 | 2 | Export |
| Start | 48 GENCO Regional OH | 25 | 1 | Import |
| Start | Lohemann's NJ | 7 | 2 | Export |

| | Category | Total Pallet# | Older than 60 days | New Arrival | Std Rec Rate (%) | Std Unit Cost ($) |
|---|---|---|---|---|---|---|
| ☐ | Women Apparel | 2 | 2 | 0 | N/A | $4.50 |
| ☐ | Electronics | 7 | 7 | 0 | N/A | $4.50 |
| ☐ | Health & Beauty Aids | | | 0 | N/A | $4.50 |
| ☐ | Miscellaneous Product | 34 | 34 | 0 | N/A | $4.50 |
| ☐ | Sports | 7 | 7 | 0 | N/A | $4.50 |
| ☐ | Toys & Infants | 40 | 40 | 0 | N/A | $4.50 |
| ☐ | Domestics | 10 | 10 | 0 | N/A | $4.50 |
| ☐ | Hardware | 16 | 16 | 0 | N/A | $4.50 |
| ☐ | Homeware | 80 | 80 | 0 | N/A | $4.50 |
| ☐ | 4 star | 15 | 15 | 0 | N/A | $4.50 |

Select

FIG 3b

Register

* = Required

Login Information
User Name
Password
Re-type Pasword

Billing Information
Company Name
First Name
Last Name
Street
City/Town/Locality
State/Province/Region
Other
Country
Zip/Postal Code
Email Address
Phone numbers
Fax Number Is the shipping address same as billing address ☐ I accept Register

FIG 4 a

| My Profile | My Preferences |

My Preferences

Submit

Conditions      Catergories      Region       Value Added Services you Provide

| Condition | Select |
|---|---|
| Closeout/Surplus | |
| Refurbished | |
| Returns | |

| Categories | Select |
|---|---|
| Baby | |
| Auto | |
| General | |
| Toys | |
| Computer/IT | |
| Jewelry | |
| Sporting | |
| Hardware | |
| Furniture | |
| HBA | |
| Food | |
| Domestics | |
| Electronics | |
| Shoes | |

| Regions | Select |
|---|---|
| U.S.M.W | |
| U.S.N.E | |
| U.S.N.W | |
| U.S.S.E | |
| Canada E | |
| Canada W | |
| U.K | |
| Australia | |
| Other | |

| Name | Description | Select |
|---|---|---|
| Defacing | | |
| Parts | | |
| Re-Packing | | |
| Recycling | | |
| Refurbishing | | |
| Sortation | | |

FIG 4b

| My Profile | My Preferences |
|---|---|

My Preferences

Export Capabilities

| Name | Select |
|---|---|
| Africa | |
| Australia | |
| Canada | |
| China | |
| Europe | |
| Russia | |
| South America | |
| UK | |

Business Type

| Name | Select |
|---|---|
| Bargain Retailer | |
| Broker | |
| Dollor Store | |
| ebay | |
| Flea Market | |
| Liquidation store | |
| Online Seller | |
| Wholesaler | |

Sales Methods

| Sales Methods | Select |
|---|---|
| Bid | |
| Call | |
| Fixed | |
| Sealed Bid | |
| Turbo Buyer | |

Lot Size

| Lot Size | Select |
|---|---|
| Less than Truck Load | |
| Truck Load | |

Annual Purchase Power

| Annual Purchase | |
|---|---|

Target B/L Size

| Target B/L size | Select |
|---|---|
| <$10000 | |
| >$10000 | |

Locations

| Locations | Select |
|---|---|
| Academy LTD | |
| Dicks Sporting Goods IN | |
| Dicks Sporting Goods NY | |
| Duane Reade PA | |
| Duckwall-Alco KS | |
| Finger Hut | |
| Harbor Freight OH | |
| Kmart CA | |
| Kmart GA | |
| Kmart OH | |
| Kohl's Findlay OH | |

FIG 4c

Ames PA / Domestic

Category: Domestics

Total : 10 pallets, 10 old pallets, 2 older than 30 days

Standard Recovery Rate: 15% - 20%

| BL# | Aging | #Pallets | Unit | Cost | Cost/Unit |
|---|---|---|---|---|---|
| 751801 | 60 | 5 | 496 | $4772.9 | $9.62 |
| 752299 | 60 | 5 | 610 | $4757.92 | $7.8 |

Potential Buyers

Sort by  Buyer ID ▼   Sort

| Buyer ID | Name | Buying Frequency (past 6 months) | Last Act Date | Total Amt | Max Rec% | Avg Rec% | Min Rec% | Unit Cost |
|---|---|---|---|---|---|---|---|---|
| 106 | INTERNATIONAL ENTERPRISES | 2 | 2001-04-19 | 1714 | 16.01 | 16.01 | 16.01 | 1.47 |
| 85 | S & M DISTRIBUTORS | 1 | 2001-04-16 | 808 | 16.01 | 16.01 | 16.01 | 1.44 |
| 28 | LUCKY DOLLAR STORE INC. | 1 | 2001-04-18 | 824 | 15.99 | 15.99 | 15.99 | 1.49 | or Enter Buyer ID

Prepare Order

FIG 5

Ames PA

Buyers Info

| Buyer ID | Name | Buying Frequency | Last Act Date | Last Act Amt | Max Rec% |
|---|---|---|---|---|---|
| 106 | INTERNATIONAL ENTERPRISES | 27 | 67823 | 2001-04-19 | 18 |

| Contact | Phone # | Fax | Email | Avg # pallets/order |
|---|---|---|---|---|
| | 3308323821 | | mattf@internationalent.com | 17 |

Temp Order Summary

| Category | #Pallets | Cost | Unit | Rec % | Cost after discount | Cost/Unit |
|---|---|---|---|---|---|---|
| Domestic | 5 | $4772.9 | 496 | 0 | 0 | 496 |
| Total | 5 | $4772.9 | 496 | | $0 | $0 |

Update Order    Generate Purchase Order    Cancel Order

Show other Categories and Continue adding Pallets

| Category | BL# | Aging | #Pallets | Unit | Cost | Unit Cost |
|---|---|---|---|---|---|---|
| ☐ Domestic | 751801 | 60 | 5 | 496 | $4772.9 | $9.62 |

Update Order

FIG 6

Ames PA

Buyers Info

| Buyer ID | Name | Buying Frequency | Last Act Date | Last Act Amt | Max Rec % |
|---|---|---|---|---|---|
| 106 | INTERNATIONAL ENTERPRISES | 27 | 67823 | 2001-04-19 | 18 |
| Contact | Phone # | Fax | Email | | Avg # pallets/order |
| | 3308323821 | | mattf@internationalent.com | | 17 |

Ames PA/Domestic

Category: Domestics

Total : 10 pallets, 10 old pallets, 2 older than 30 days

Standard Recovery Rate: 15% - 20%

| BL# | Aging | #Pallets | Unit | Cost | Cost/Unit |
|---|---|---|---|---|---|
| 751801 | 60 | 5 | 496 | $4772.9 | $9.62 |
| 752299 | 60 | 5 | 610 | $4757.92 | $7.8 |

Add to Order | Show other Categories

FIG 7

SALVAGE LIQUIDATION SYSTEM AND A METHOD TO LIQUIDATE SALVAGE

RELATED APPLICATION

This application is related to Provisional Application No. 61/041,200, filed May 6, 2008, the teachings of which are incorporated herein by reference.

BACKGROUND OF THE INVENTION

The present invention relates to a salvage liquidation system and a method to liquidate salvage goods efficiently. More particularly the invention relates to a system and method to auto-match buyers with salvage goods; auto-ship the salvage goods to the buyer; and to produce an invoice and effect automatic payment of the invoice from the buyers financial institution or designated payor to the sellers designated financial institution or payee.

Large retail sellers of goods require outlets for excess stock, returns and salvaged products. In general, such retailers sell off the unwanted products to liquidators who assemble lots for resale to one or more buyers who in turn sell the products at a discount.

In a typical transaction, a large retail seller such as Sears, Target, K-Mart and the like contract with a liquidator who agree to accept excess goods from the retailer. The liquidator locates one or more potential buyers and offers the goods to them. Locating the potential buyers may be done by on-line advertising, telephone communications or whatever is workable in the shortest amount of time.

In some transactions, the liquidator does not take title, but simply receives a commission for selling the goods. Alternatively, the liquidator may take title and seek out buyers who will take the goods at a mark up which the liquidator takes as profit. The buyer receives the goods and pays the contract price. The payments are processed either by the retailer who pays the commission or by the liquidator directly.

In either situation, there are transaction costs associated with finding a buyer, negotiating a price, shipping the goods and processing the payments. These costs occur each time the goods are processed. In order to reduce transaction costs, goods may be packaged in lots, e.g. pallet loads, truck loads, container loads, whereby large quantities of goods are processed in bulk.

Unfortunately, even with efficiency achievements realized using bulk processing, there are still significant transaction costs, because each sale requires the liquidator to find a buyer, negotiate a price, ship and process payments.

In addition to the cost associated with processing the sale of such goods, it is often necessary to move goods from the retailer into storage until lots can be assembled. Storage involves extra handling and consequently adds to the transaction cost.

Some retailers have goods which are available for only a short period of time, e.g. excess seasonal goods or perishable goods. Others may have to liquidate products on an ongoing basis, like returns. Each situation requires a different strategy for most efficiently liquidating the goods.

In addition, it is important to maximize the monetary return for the liquidated goods. For example, it is advantageous to liquidate the goods at the highest possible price. However, it may be more advantageous to liquidate the goods as quickly as possible in order to reduce finance charges. Other considerations may require different strategies as well. In any event, there are many factors which can affect the amount realized in any particular situation.

Ideally, it would be beneficial if the liquidator could avoid the intermediate handling step and arrange for the direct shipment of the goods from the retailer to the buyer. This is often not practical. Sometimes truckloads of goods can be received by the liquidator at a reshipping or distribution center, whereupon the goods may be stored, or repackaged or sorted into one or more loads. If the goods are in immediate demand by the buyers, some of the repackaged goods may be loaded for direct shipment to such buyers without placing them into storage. Accordingly, there are methods which alleviate the management of salvage goods, but no method exists which can address the many problems and inefficiencies which are attendant to the salvage liquidation business.

Also, the automated solutions offered by the prior art involves multiple negotiations, no prior decision is possible in the systems of the prior art. Therefore, it does not result in reducing the carrying cost.

SUMMARY OF THE INVENTION

The invention is directed to a method and apparatus for effecting electronic commerce via a network. According to the invention, products available for liquidation are identified. Buyers who are eligible to purchase the available goods are identified according to buyer relevant data. Selected goods are matched and prepared for shipment to the selected buyer in accordance with other relevant data. An invoice representing the selected goods is generated and forwarded to the buyer's financial institution for presentation and payment. Concurrently with shipment of the goods, the presented invoice is automatically paid by the payor directly to the seller's financial institution or payee to thereby conclude the transaction with little or no direct intervention by the sellers and the buyers.

It is therefore an object of the invention to achieve a more efficient method for liquidating salvage, excess and returned or damaged goods.

It is also an object of the invention to reduce as much as possible the handling and transaction costs associated with salvage liquidation.

It is yet another object of the invention to reduce multiple negotiations between the buyer and seller thereby reducing carrying costs.

It is also an object of the invention to allow for expansion or contraction of the amount which a particular buyer will take, particularly in situations of higher than normal supply or under conditions of scarcity.

According to the invention, there is provided a system for liquidating goods on a just-in-time basis. There is also provided a system which is sufficiently flexible so that ongoing or so called evergreen transactions can be managed over indefinite or prolonged time frames. In addition the system is capable of handing one-off transactions or those having a limited time horizon.

According to the invention, there has been provided a method for effecting electronic commerce via a network. The method includes identifying one or more products to be sold; identifying a set of potential buyers for said products based on first set or rules or criteria; matching one or more of the identified products with at least one of the potential buyers based on a second set of rules or criteria; and shipping the matched goods to the buyer.

The invention describes the process of receiving excess or salvage product from the retail sellers to outlet buyers.

According to the invention, the potential buyers are pre-qualified as to what categories or classes of goods they will agree to accept; the amount of such goods they will agree to accept; credit worthiness of the buyer; and other criteria which may affect what will be sold to the various buyers.

Such buyers may be thus categorized in a hierarchy or order of priority for receiving goods. For example, if one buyer is willing to accept goods in truckload lots including a wide variety of categories, and another is willing to accept goods in lesser amounts or in more restricted categories, the first buyer will be a preferred buyer and goods will be automatically matched with such buyer first, so that the truck load is more quickly assembled.

On the other hand, if the second buyer is willing to accept lesser amounts or more restricted categories, but is willing to pay a higher price for the more selective shipments, that buyer may be preferred for a particular shipment.

The matching of categories of goods and the prioritization of buyers for such goods may be optimized according to a variety of rules or criteria which may be selected by the liquidator.

The criteria for selecting potential buyers and for matching buyers with available goods are selected to measure how likely it is that the goods can be liquidated at the highest recovery rate and in the shortest amount of time.

According to the invention, buyer qualification criteria include questions such as what was the last purchase for each buyer, what amount did the buyer accept of each category, what amount did the buyer pay for each accepted category of goods, have the buyer's purchases increased or decreased over time. Other criteria have to do with the logistics of shipping. For example, where are the goods located; or where are the locations of the buyers closest to the goods so as to minimize the shipping cost in terms of distance or time.

In an exemplary embodiment of the invention, the handling of goods may be improved by dynamic handling of goods with little or no dwell time in storage. This may be achieved using cross docking where goods are moved from inbound status to outbound status on the loading dock without entering the storage facility.

Yet another feature of the invention is to automatically ship the goods upon generation of an invoice. The invoice is directly presented to the financial institution of the buyer which automatically credits the seller's financial institution upon such presentation, whereby the transaction is concluded without other intervention.

In another embodiment techniques for avoiding storage known as cross docking may be employed. Such systems also contemplate arranging for automatic direct shipments from the seller to the buyer without transferring the load from one vehicle to another. In this connection, techniques may be employed to move the goods from one location to another on a just in time basis to minimize financing, moving and handling costs.

Data is stored in a variety of formats to allow for more efficient current analysis of the process and to enable the liquidator to view historical information to spot trends and make changes in the allocations to improve system efficiency. Historical information can be analyzed to analyze and possibly reprioritize buyer preferences over time.

Although the system is designed to operate automatically, it is possible when the situation warrants it to conduct individual negotiations for buyers and sellers.

BRIEF DESCRIPTION OF THE DRAWINGS

The invention will be further explained with reference to the attached drawings.

FIG. 2 is a screen shot showing seller information including a unique ID, available product information; and eligible buyer information.

FIG. 3a is a screen shot showing exemplary categorization of available goods located at various seller facilities.

FIG. 3b is a screen shot showing information as to the status of various categories of goods in a particular facility.

FIGS. 4a-4c are screen shots showing information fields requested in a buyer registration form for enabling automated matching of buyers with available goods.

FIGS. 5-7 are screen shots showing exemplary automatches of salvage goods with eligible buyers

Figure 1:
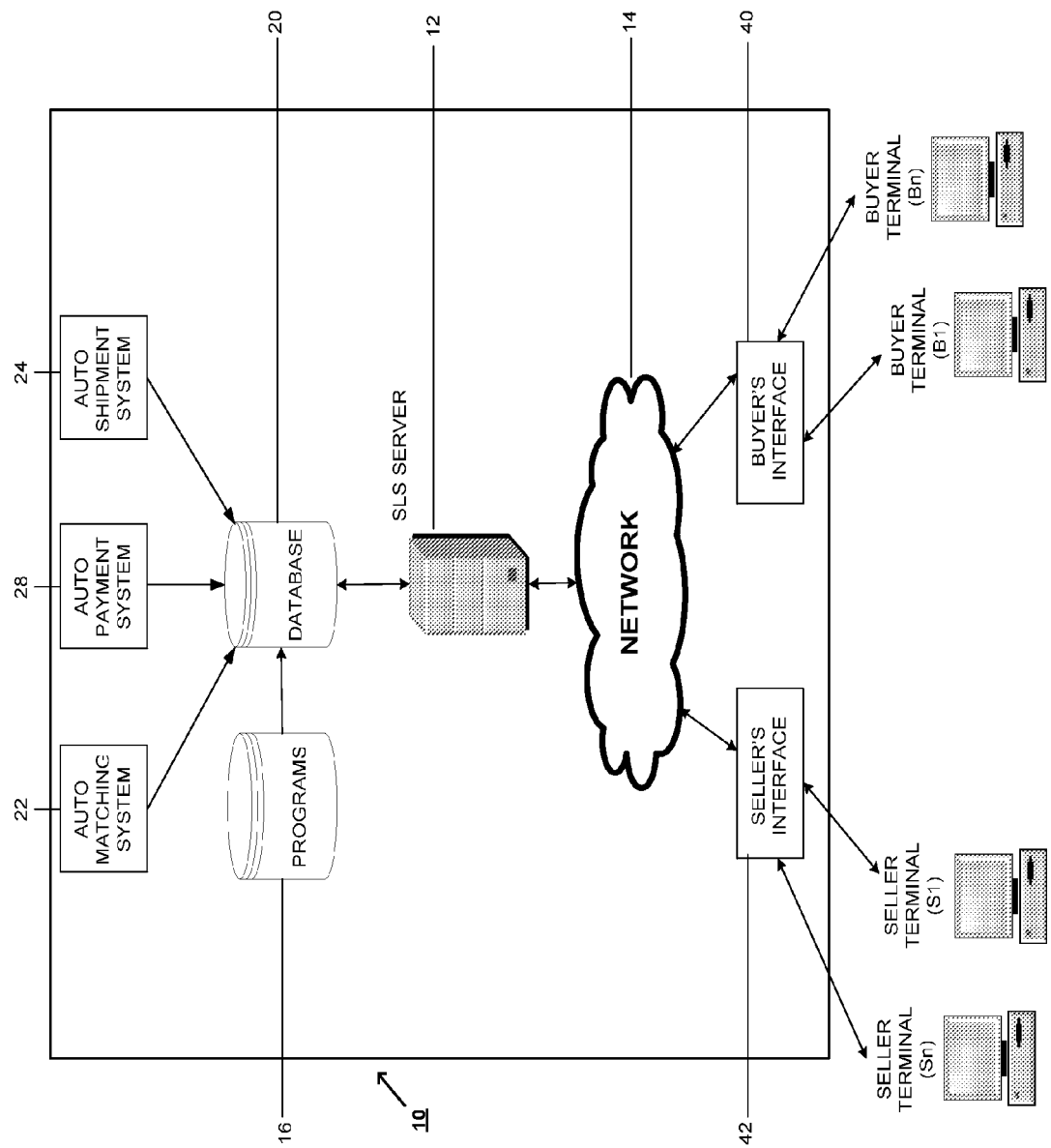
FIG. 1 is a network diagram illustrating an exemplary embodiment of the invention.

DESCRIPTION OF AN EXEMPLARY
EMBODIMENT OF THE INVENTION

The invention relates to a method and a system for liquidating excess production, returns, out of season and salvaged goods, generally referred to as salvage. In particular, the invention pertains to automating the process of salvage liquidation for improving efficiency and increasing recovery. This is achieved by reducing handling and transaction costs associated with salvage liquidation.

The invention may be described as a method and apparatus for effecting electronic commerce via a network. Products or goods available for liquidation are identified. Buyers who are eligible to purchase the available goods are identified according to rules or critera relevant to the buyer. Selected goods are matched and prepared for shipment to selected buyers in accordance with other rules or critera relevant to other conditions. An invoice representing the selected goods is generated and forwarded for presentation directly to the buyer's financial institution for payment. Concurrently with shipment of the goods, the presented invoice is paid directly to the seller's financial institution. The transaction is thereby concluded with little or no direct intervention or action by the buyers or sellers.

Certain underlying criteria or rules govern the allocation of goods. Such criteria may be related to the status of the buyers. Other criteria or rules may be related to things like the condition of the goods, or geographic conditions, or shipping conditions. Generally, criteria or rules are related to some subject, e.g. the buyer, the seller, the goods, transportation, geography and the like. Whatever rules or criteria are used determines the disposition of the goods in various circumstances. The system is sufficiently flexible to allow for different conditions to be evaluated for maximum efficiency. Sometimes efficiency gives way to buyer or seller preferences which may be instituted for business or marketing reasons.

FIG. 1 illustrates the architecture of an exemplary salvage liquidation system 10. A suitably programmed central processing unit in the form of a server 12 is coupled to a network 14 for carrying data and communications signals. The server 12 has a storage device 16 for storing computer readable media in the form of executable programs 18 for operating the system and a data base 20 for organizing relevant information regarding the buyers, the sellers and the goods. The server has a plurality of modules including an auto match module 22 for matching buyers with available goods; an auto ship module 24 for effecting shipment of selected goods to selected buyers; and an auto pay module 28 for achieving automatic invoice generation, presentation and payment to conclude the transaction.

In the exemplary embodiment, buyer terminals B1-Bn are coupled by a buyer interface 40 to the network 14. Likewise seller terminals S1-Sn are coupled to the network 14 via a seller interface 42 as shown.

In an alternative embodiment the product and seller info is entered into the system by the system manager in response to a separate communication from the seller.

The auto match module 22 is a suitably configured system operable by an executable computer program to identify goods to be sold to eligible buyers. The auto ship module 24 is a suitably configured system operable by an executable program to provide instructions and authorization to ship the goods automatically upon the occurrence of certain preconditions, for example the goods are available; the qualified buyer is selected. The auto payment module 28 is a suitably configured system operable by an executable program to provide instructions and authorization to create an invoice and effect direct presentation of the invoice to the buyer's financial institution for payment to the sellers financial institution to complete the transaction automatically without direct intervention of the buyer or the seller.

Thus, the invention provides an automated system for matching a eligible buyers with available goods which are automatically shipped to the buyer and where payment is automatically achieved by communications between the shipper and the buyer's financial institution, and then from the latter to the seller's financial institution.

The salvage liquidation system further includes a database where information concerning the available goods, the eligible buyers and the sellers resides. The information is maintained and updated on a periodic basis or in real time as required. The data base also contains historical data in a variety of relevant fields suitable for allowing the programs to optimize sales and cost recovery.

Sellers are usually retailers or manufacturers who are interested in liquidating excess inventory or salvage. A seller may be anyone of a variety of businesses having goods for sale. For example, large chains having nationwide retail sales outlets like Target, Sears and WallMart stores need to have a way to control inventory fluctuations and to dispose of unwanted merchandise. Manufacturers of goods likewise need a system to dispose of unsold production, returned goods and seconds. The system manager posts each seller's details of the goods to be liquidated. Thus, information regarding goods for sale is made available for automatic matching and shipment to qualified buyers. In an alternative embodiment, the seller can post the details directly, or the seller can communicate to the system manager a data file for posting which can be manually entered or automatically input.

The auto-match module 22 generates codes to identify the goods, the sellers, and the eligible buyers. Each lot of goods is coded with a bill of lading BL number. FIG. 2 shows a screen shot of information concerning goods available from a particular seller, Target.com. The goods, generally described as "Category 79-Furniture" are segregated by "BL#" lots by quantity "# Pallets". Thus the goods are categorized by type, quantity, source and date made available or "Date Created".

Eligible buyers are also shown in FIG. 2. The buyers are identified by an ID and by name. Other information, such as communications or contact information is shown. In addition, data regarding the amount in dollars that can be shipped automatically is shown as the "Safe Amt." Some history of prior transactions and the amount The products may be categorized based on the facility where the goods are located or by the seller's name or both. As shown in FIG. 3a, products located at various locations are shown by quantity and kind (categories). FIG. 3b shows goods located a particular facility identified in FIG. 3a, are further categorized by kind, price, amount and aging. The products may fall into any of a variety of categories such as cosmetics, apparel, domestics, furniture, electronics, housewares, building materials or the like. The database also has information regarding the amounts of available goods in pallet units. There can be a separate entries or fields specifying new arrivals, number of pallets, age of Inventory, standard recovery rates and standard unit costs for each product category in that particular facility.

Information regarding buyers is used to qualify the eligibility of buyers to receive goods. Buyers are individuals or companies who have registered on the system to receive goods. Buyers self register on-line via network. FIGS. 4a-4c show screen shots of information fields solicited when the buyer logs on to the system.

The buyer using the interface available through a network registers into the system in order to participate in auto match. Typical, but not exclusive, of the requested information is identification data, product preferences, exclusions, approved locations for shipment of goods, banking information and the like. Other requested information provides a broad base of data which allows the system to finely distinguish buyer qualifications and preferences. This allows for better optimization of matching decisions. Buyer registration data can be updated and modified by the buyer by simply logging onto the system and entering changes.

During the registration the buyer may be required to fill in the detailed billing information including the complete name of the buyer, complete address along with the city, state, country and postal code details, and phone or fax number. Further the interface also asks whether the billing address and the shipping address will be same for that particular buyer or not. Once the buyer fill in these details and confirms acceptance of the terms and conditions of the system, a buyer account is created which includes a buyer ID and password for doing business on the system.

The registration may provide many many options for the buyer. Such options include preferences for the types or kinds of goods which would be acceptable, e.g., baby, auto, general, toys, computer, jewelry, sporting, hardware, furniture, food, domestics, electronics, shoes, apparel and the like. Also, preferences as to the quality and condition of the goods may be selected, e.g first quality, seconds, refurbished, salvage, damaged, parts, returns, with or without packaging, closeouts, and the like. The buyer can also choose the source or seller from which goods would be acceptable, the region where the buyer prefers the products to be purchased or delivered. Limits on shipping distances or costs may be entered.

The seller may, if desired, be provided with additional options including for example, how the price of the goods will be determined, e.g. auto matching, bidding, auction. Sources may be excluded or included, like US, Canada, UK, Australia, and China.

The buyer may also be provided with various options. For example, the buyer may select the way of doing the transaction which can be either by bidding, calling, sealed bidding or auto matching. Minimum and maximum lot size can also be specified by the buyer, for example by choosing between a truck load (TL) or less than truck load (LTL) of products; pallet units or less. In addition, the buyer may specify the maximum amount of the annual or monthly spend. The maximum BL amount can also be selected. In addition the system management may add fields periodically, and the buyer may request or use open fields to add preferences.

After the buyer information is collected, each buyer is categorized based on the nature of their business, the selected preferences, contact information. In addition, as the buyer participates in the system, historical information is compiled to thereby add information concerning the buyer. For example, current or historical buying frequency, last activity date i.e. the date when the buyer last carried out a transaction, transaction amount, unit cost, and the minimum, maximum and average recovery rates and the like can be compiled.

The auto match system is based on the buyer's preferences and buyer pre-conditions. The auto match module 22 identifies goods for sale and generates a list of potential eligible buyers for the identified goods. A first set of rules or conditions is used to make a list of eligible buyers from the universe of available buyers in the database. The first set of rules may include factors that are significant to the system operator in deciding the eligibility of the buyers. The eligibility of buyers can be made dependent upon factors related to the buying capacity, credibility, buying frequency, or the like. Auto match screen shots are shown in FIGS. 5-7.

The information specified by the buyer during registration facilitates the determination of the particular buyer's eligibility to take a particular shipment. The information may specify an overall annual limit on purchasing. Alternatively, certain goods may be excluded from the mix of goods the buyer is willing to accept. There may be upper limits on the number of pieces or pallet loads a buyer will accept, or there may be minimum numbers of items a buyer will take. Whatever conditions are specified are considered in making the determination as to whom the goods may be shipped.

Other factors may also be considered. For example, the status of the account is a factor, e.g. whether it is dormant or active. Whether the buyer is a bargain retailer, a broker or an online shopping merchant may also be a relevant factor to consider. As noted, the type, quality and condition of goods are relevant factors.

Information specified by the buyer is thus used to qualify a buyer for a particular shipment. However, other factors not specified by the buyer may be relevant. For example, because the seller desires to maximize the return on the value of goods sold, the seller may specify that goods may not be shipped more than a certain distance. This may be because shipping costs if included in the price may exceed the load value. Alternatively, the seller may want to limit the sale of goods in a certain geographic area; or the seller may wish to distribute the goods over a wide geographic area. Whatever reasons prevail, the eligibility of the buyer to take goods may be determined by factors other than the buyer's ability pay or absorb the goods.

An exemplary first set of factors affecting buyer eligibility may include:
1. Annual purchasing capability of the buyer
2. Maximum purchase per transaction
3. Account status (Active/Dormant)
4. Last purchase activity
5. Credit worthiness
6. Target B/L size
7. Condition of salvage
8. Category
9. Lot size
10. Business Type
11. Region The first set of factors or criteria are not limited to those provided here. Any number of criteria can be set.

An exemplary second set of factors affecting eligibility may include:
1. Seller restrictions on volume sales to any particular buyer
2. Seller restrictions on concentration of goods in a particular location
3. Limitations on shipping distance The second set of factors or criteria are likewise not limited to those provided here. Any number of criteria can be set.

Auto match module automatically matches the goods to be liquidated to the potential buyers based on a set of pre-determined criteria or rules which take into account not only the buyer's restrictions, but also system requirements.

When an auto match is determined, a pre-computed order summary is created by the auto-match subsystem and may be sent to each of the potential buyers automatically via e-mail. If the buyer is interested in the shipment, the buyer responds with an affirmative indication, if not, then a negative indication. No response within a defined timeframe is assumed to be a negative indication.

The auto-match system then further narrows down the prioritized list of qualified buyers to identify the final list of buyers. The identification of one or more buyers is mostly situation dependent which include parameters that are dynamic in nature and are capable of changing according to the situation. The second set of factors can be anything that affects recovery rate or results in the shortest shipping distance.

Once the buyer or buyers are selected, the auto ship module 24 provides instructions to prepare the goods for shipment. The shipping module selects the mode of shipping and makes other decisions to most cost effectively move the goods. If speed is a factor, cost may take a lower priority in the decision logic.

The auto ship module may raise an invoice identifying the goods, the buyer, the payment instructions and the shipping information. This invoice is then transferred to the auto pay module 28 to complete the transaction. In the auto pay mode, the invoice is sent to the buyer's financial institution for presentation and immediate payment. The buyer does not see the invoice prior to payment, nor does the buyer make a payment decision. The invoice is simply presented directly to the buyer's financial institution and payment is made electronically directly to the financial institution upon conditions specified in the instructions. Payment may be made before, concurrently with or after shipment as specified by the parties.

In this connection, in an alternative embodiment, the buyer may simply receive a notice that certain goods are being shipped. In this embodiment, the buyer has previously agreed to accept what ever is shipped which conforms to buyer selected criteria resident in the database. In this situation shipment occurs automatically on a pre selected schedule or whenever a load unit is complete. Presentation of invoices and payment are completely automatic, thus further expediting payment, disposition of the goods and conclusion of the transaction.

In another embodiment of the invention, salvage to be liquidated is auto-matched based on at least one set of criteria with at least one buyer and auto shipped to one or buyers.

According to the invention, there has been provided a method for effecting electronic commerce via a network. The method includes identifying one or more products to be sold; identifying a set of potential buyers for said products based on first set or rules or criteria; matching one or more of the identified products with at least one of the potential buyers based on a second set of rules or criteria; and shipping the matched goods to the buyer. In addition, an invoice is generated which is presented directly to the buyer's financial institution which electronically pays the sellers financial institution or designee upon receipt thereof.

The seller participates in salvage liquidation in a similar way. In one embodiment the system manager enters into the system the information supplied by the seller regarding the goods. In a different embodiment, the seller may log into the system and provide information similar to the at supplied by the buyer, plus any other information needed to allow the system to effectively match the goods with eligible buyers in the auto-match module. The seller may be prompted by the system to enter all required information to categorize the salvage. The information is stored in the database.

In a like manner, any buyer interested to buy salvage products may log into the system and after being prompted to provide the required information may participate. The buyer may browse the data and bid on products. The system then selects the buyer with the highest bid, provided the buyer is otherwise eligible. For example the bid may be the highest, but the buyer may be in default and thus not eligible, or the buyer may be in an ineligible geographic region. However, if the buyer is eligible, the goods are auto shipped, and auto billed The method is adapted to work with a data base which contains historical information in a variety of fields suitable for optimizing sales and cost recovery. The data includes buyer specific information and product specific information.

The products listed in the database may be categorized based on the facility where the goods are located. Each facility may be further categorized depending on the product categories and quantities stored there. The inventory database also has the information regarding the unit amounts TL, LTL, pallets, individual units and so on. Periodically, the data is updated as goods are added and as goods are disposed of. There is a separate entries or fields specifying new arrivals, number of pallets, age of Inventory, standard recovery rates and standard unit costs for each product category in that particular facility.

A database for buyers is maintained to keep a track of the buying history of each buyer and their requirements. Each buyer in the database is categorized based on the individual buyer identification, contact information, buying frequency (in past 6 months, year, days), last activity date i.e. the date when the buyer last carried out a transaction, transaction amount, unit cost, and the minimum, maximum and average recovery rates.

The buyers database can be sorted on the basis of any desired features or characteristics of individual buyers. Thereafter the available products in the inventory database with the requirements of the buyers specified in the buyers database.

According to the invention, buyer matching criteria include questions such as what was the last purchase for each buyer, what amount did the buyer accept of each category, what amount did the buyer pay for each accepted category of goods, have the buyer's purchases increased or decreased over time. Other criteria have to do with the logistics of shipping. For example, where the goods are located; or where are the locations of the buyers closest to the goods so as to minimize the shipping cost in terms of distance or time.

According to the invention, the potential buyers are pre-qualified as to what categories or classes of goods they will agree to accept; the amount of such goods they will agree to accept; credit worthiness of the buyer; and other criteria which may affect what will be sold to the various buyers.

Such buyers may be thus categorized in a hierarchy or order of priority for receiving goods. For example, if one buyer is willing to accept goods in truckload lots including a wide variety of categories, and another is willing to accept goods in lesser amounts or in more restricted categories, the first buyer will be a preferred buyer and goods will be automatically matched with such buyer first, so that the truck load is more quickly assembled.

On the other hand, if another second buyer is willing to accept lesser amounts or more restricted categories, but such buyer is willing to pay a higher price for the more selective shipments, that buyer may be selected as the preferred recipient for a particular shipment.

The matching of categories of goods and the prioritization of buyers for such goods may be optimized according to a variety of rules or criteria which may be selected by the liquidator.

When a buyer reaches consensus with the liquidator the buyer arranges for payment through electronics funds transfer. The bank sends an automatic notification to the inventory regarding the receipt of payments along with the order summary. At this stage a pre-computed order summary becomes a permanent purchase order. On receiving the notification of transfer the product is automatically shipped to the buyer, and the purchase order is saved into the database for further reference.

In another embodiment of the invention, the handling of goods may be more efficiently expedited by taking advantage of the prioritization accorded the goods so that they may be dynamically handled with little or no time in storage. The advantage of minimizing or eliminating storage altogether further improves profit potential by reducing transaction and storage related costs.

In this connection, an important determinant of eligibility may be shipping efficiency. In such a situation, the goods may be immediately available and accessible for shipment to a particular buyer that the price is secondary to the decision. For example it is possible to move goods through the system quickly by bypassing storage. The technique known as cross docking means that goods on an incoming truck can be transferred to an outgoing truck in an adjacent bay whereby the goods do not enter the storage are of the warehouse. Thus, it may be more economical to cross dock the goods at a lower price to thereby dispose of the goods quickly and achieve a higher or comparable return. Handling costs and interest costs may be reduced or eliminated by such quick disposal so that the price differential is unimportant.

It is also possible to effect transfer of goods directly from the seller location directly to the buyer location. In such a scenario, a truck load of televisions, for example, may be directly shipped to an outlet non-stop. In such an arrangement, the paper work occurs automatically as the goods move directly to the buyer without delay.

In a variation of the above arrangement, the seller or the buyer may wish to dispose of goods dynamically. The goods may be available for retail sale at a particular location an up to a specific date after which they will be moved for disposal. In such an arrangement, the buyer may schedule receipt of the goods in a coordinated effort with the seller. Thus goods are moved on a just-in-time basis from one location to another.

According to the invention, liquidating goods on a just-in-time basis is prearranged. The method of the invention is sufficiently flexible so that ongoing or so called evergreen transactions can be managed over indefinite time frames. These are prearranged agreements for handling excess inventory on a regular basis, like the direct or just-in-time method, paperwork, instructions and shipping are handled automatically as the goods move. The invention is also flexible enough to be able to handle individual transactions or deals having a one off time horizon or perhaps a horizon for a definite time of some weeks or months.

In an arrangement involving a series of prior agreements, the liquidator and buyers agree to accept certain categories of goods in certain lot sizes. For example, buyer agrees to take two truckloads a week of electronics, housewares, appliances and building materials. The liquidator then simply tracks incoming goods and loads a truck with any or all of those goods for that buyer, who has agreed to accept whatever is sent. Concurrently with the shipment, an invoice is automatically sent to the buyer who either processes it immediately for payment, or the invoice goes to the buyers financial institution who has been instructed to pay the invoice automatically upon receipt by electronics funds transfer.

The invention claimed is:

1. A computer-implemented method for effecting electronic commerce via a network comprising:
   entering into a database on a server first information with respect to a plurality of potential buyers;
   entering into the database second information with respect to a product;
   applying via one or more processors a first set of rules to the first and second information to identify from the plurality of potential buyers one or more eligible buyers for the product;
   applying via the one or more processors a second set of rules to the one or more eligible buyers to select and automatically consummate a transaction with one or more buyers of the product;
   automatically sending via the one or more processors an invoice to each of the one or more buyers of the product; and
   automatically initiating shipment of the product via the one or more processors to the one or more buyers.

2. The computer-implemented method of claim 1 further comprising receiving via the one or more processors an automatic payment for the respective invoice from each of the one or more buyers.

3. The computer-implemented method of claim 1 wherein the first information comprises details of a preauthorization from each of the plurality of potential buyers to buy products from at least one category of products.

4. The computer-implemented method of claim 1 wherein the first set of rules includes at least one metric corresponding to a frequency with which each of the plurality of potential buyers has previously purchased products in each of one or more product categories.

5. The computer-implemented method of claim 1 wherein the first set of rules includes at least one metric corresponding to an amount of one or more products regularly purchased by each of the plurality of potential buyers.

6. The computer-implemented method of claim 1 wherein the first set of rules includes at least one metric corresponding to a spending limit for each of the plurality of potential buyers.

7. The computer-implemented method of claim 1 wherein the second set of rules includes:
   a list of one or more locations for each of the plurality of potential buyers.

8. The computer-implemented method of claim 1 further comprising:
   presenting the invoice via the one or more processors directly to a buyer payor.

9. The computer-implemented method of claim 1 wherein each of the first set of rules and the second set of rules comprises at least one criteria relevant to the product, a seller or at least one of the plurality of potential buyers.

10. The computer-implemented method of claim 1 wherein each of the first set of rules and the second set of rules relates to at least one criteria comprising one or more preferences of at least one of the plurality of potential buyers or one or more preferences of a seller of the product.

11. The computer-implemented method of claim 1 wherein one or both of the first set of rules and the second set of rules relate to a pre-arranged agreement between a seller of the product and one or more of the plurality of potential buyers.

12. A system for effecting electronic commerce via a network comprising:
   means for identifying a product to be sold;
   means for identifying a set of potential buyers based on a first set of conditions, wherein the conditions include a pre-arranged agreement to purchase the product entered into respectively between each of the potential buyers and a seller of the product;
   means for automatically selecting and consummating a transaction with one or more of the potential buyers as the buyer of the product;
   means for automatically generating and sending an invoice for the product to a designee of each of the one or more buyers;
   means for automatically initiating shipment of the product to the one or more buyers;
   and means for receiving payment for the product from the designee of each of the one or more buyers.

13. A computer readable media storing a set of program instructions wherein execution of the said program causes one or more processors to perform the steps of:
   identifying a product to be sold;
   identifying potential buyers based on first set of conditions, wherein the first set of conditions includes a pre-arranged agreement to purchase the product entered into respectively between each of the potential buyers and a seller of the product;
   selecting and automatically consummating a transaction with one of the potential buyers as a buyer of the product based on a second set of conditions;
   automatically generating and sending an invoice for the product to a payor;
   automatically initiating shipment of the product to the buyer;
   automatically receiving payment for the product from the payor.

14. A computer-implemented method for effecting electronic commerce via a network comprising:
   entering into a database on a server first information with respect to a plurality of potential buyers of a product;
   identifying via one or more processors a set of eligible buyers based on the first information and a first set of rules, wherein the first information comprises terms of a pre-arranged agreement to purchase the product entered into respectively between each of the potential buyers and a seller of the product;
   selecting and automatically consummating via the one or more processors a transaction with a buyer of the product based on a second set of rules;
   automatically generating and sending via the one or more processors an invoice for the product to a payor;
   automatically initiating shipment of the product via the one or more processors to the selected buyer;
   automatically directing to a payee via the one or more processors payment for the product directly from the payor.

* * * * *